United States Patent Office 3,404,103
Patented Oct. 1, 1968

---

3,404,103
METHOD OF DECOMPOSING URETHANE POLYMER
Nobutaka Matsudaira, Sakae Muto, Yoshitake Kubota, and Toshio Yoshimoto, Tokyo, and Shigetake Sato, Yokohama, Japan, assignors to Bridgestone Tire Company Limited, Tokyo, Japan
Filed June 1, 1966, Ser. No. 554,581
Claims priority, application Japan, June 10, 1965, 40/34,052; Dec. 21, 1965, 40/78,234
7 Claims. (Cl. 260—2.3)

ABSTRACT OF THE DISCLOSURE

Polyurethane made from a polyether and an isocyanate is thermally decomposed in the presence of (i) an amine and (ii) an alkali metal oxide or hydroxide or an alkaline earth metal oxide or hydroxide. The products obtained are (a) the polyether and (b) an amine corresponding to the isocyanate used to prepare the polyurethane wherein the —NCO groups of the isocyanate are substituted with amino groups.

---

The present invention relates to a method of recovering polyether of the starting material of an ether based urethane polymer and amine derivative derived from polyisocyanate compound of the starting material by decomposing said urethane polymer chemically.

In the production of polyurethane foams and polyurethane elastomers obtained by polymerization from polyether and polyisocyanate, 15 to 30% of the scrap were generated and possibility of effective use of such a scrap seriously affects the production cost.

The present invention consists in a method of decomposing a polyurethane produced by reacting a polyether and an organic polyisocyanate which comprises:

(A) thermally decomposing said polyurethane at a temperature of less than about 250° C. in the presence of:

(1) at least one amine selected from the group consisting of (i) aliphatic amines, (ii) cycloaliphatic amines, (iii) aromatic amines, (iv) heterocyclic amines, and (v) derivatives thereof, and (2) at least one compound selected from the group consisting of (i) alkali metal oxides, (ii) alkali metal hydroxides, (iii) alkaline earth metal oxides, (iv) alkaline earth metal hydroxides, and (v) aqueous solutions thereof to obtain (a) an amine derivative having the chemical structure of said organic polyisocyanate wherein the —NCO groups of said organic polyisocyanate are substituted by amine groups, and, (b) said polyether, and (B) separating and recovering said amine derivative and said polyether.

Urethane polymers have a large number of urethane bonds, urea bonds, biuret bonds and allophanate bonds. The mechanism of the decomposition of monomers having these types of bonds are generally thermal dissociations, wherein urea compound is decomposed into amine and isocyanate compound, and urethane compound is decomposed into alcohol and isocyanate compound, but these reactions are reversible, so that it has been considered that the isolation of the decomposed product is difficult.

According to the present invention, an ether based urethane polymer is decomposed by a quite novel decomposing agent to make the reversible reaction unreversible, whereby polyether and amine derivative are recovered from the decomposed product.

The mechanisms of decomposition reaction of urethane polymer according to the present invention are as follows:

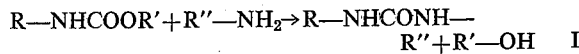

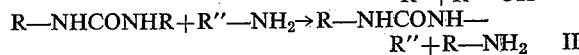

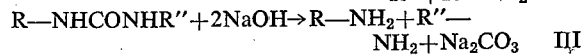

In the reaction Formulae I, II and III, R represents an isocyanate residue used in production of the urethane polymer, R' represents a polyether residue and R'' represents an amine compound residue to be used as the decomposing agent. In the decomposing of a urethane bond in the urethane polymer, a urea derivative is produced together with a polyether as shown in the reaction Formula I. Furthermore, in a urea bond an amine derivative is produced together with a new urea derivative as shown in the reaction Formula II. The urea derivatives produced newly in the reaction Formulae I and II are reacted with action of alkali metal or alkaline earth metal compound, such as sodium hydroxide which coexists in the decomposition system to recover an amine derivative having the chemical structure of an organic polyisocyanate wherein the —NCO groups of an organic polyisocyanate used in production of the urethane polymer are substituted by amine groups and an amine compound used in the decomposition as shown in the reaction Formula III.

The mechanism of decomposing the urethane polymer by an amine in the presence of an alkali metal or alkaline earth metal compound is as mentioned above, but for example, if the explanation will be made in more detail with respect to an example, wherein an ethanol amine is used as the amines, the mechanisms are as follows:

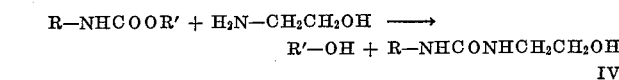

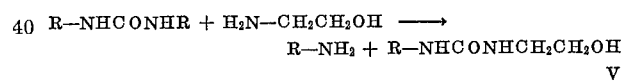

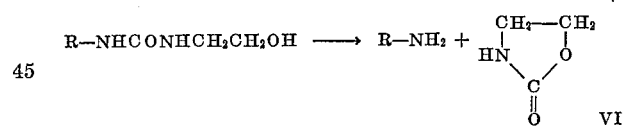

In the reaction Formulae IV, V and VI, R represents an isocyanate residue used in production of the urethane polymer and R' represents a polyether residue.

That is, the urethane bond is decomposed according to the reaction Formula IV to produce a hydroxyethyl urea derivative and a polyether. The urea bond is decomposed according to the reaction Formula V to produce a hydroxyethyl urea derivative and an amine derivative. The hydroxyethyl urea derivative produced in the reaction Formulae IV and V are further decomposed according to the reaction Formula VI to form an amine derivative together with oxazolidone-2

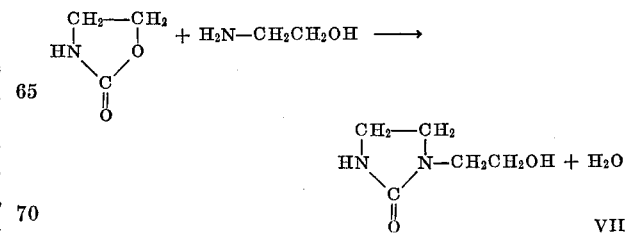

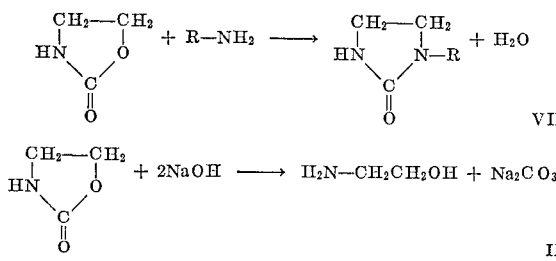

$$\text{VIII}$$

$$\text{IX}$$

When the urethane polymer is decomposed solely by monoethanolamine, side reactions are generated with oxazolidone-2 produced according to the reaction Formula VI to form imidazolidone derivatives as shown in the reaction Formulae VII and VIII, whereby monoethanolamine used as the decomposing agent and an amine derivative of the decomposition product are consumed in a large amount.

However, if the decomposition reaction of these urethane polymers are carried out, for example in the presence of sodium hydroxide, oxazolidone-2 formed in the Formula VI is returned back again to monoethanolamine as seen in the reaction Formula IX. Moreover, it has been found that the reaction in the Formula VIII is completely stopped and the reaction in the Formula VII is substantially suppressed in the coexistence of sodium hydroxide. Thus, when using ethanolamine derivative among amine compounds as the decomposing agent, polyether used in production of the urethane polymer and the amine derivative having the chemical structure of the organic polyisocyanate wherein the —NCO groups of the organic polyisocyanate are substituted by amine groups can be recovered by coexistence of oxides or hydroxides of alkali metal or alkaline earth metal in these decomposition systems, but oxazolidone and imidazolidone derivatives are by-produced without coexistence of such a compound.

When using particularly a compound wherein group R″ is same as group R as the decomposing agent in the reaction Formulae I, II and III, the amine compounds of the decomposing agent are same as the amine derivatives of the decomposed product, so that it is not necessary to separate and purify both substances and highly pure compound can be obtained. For example, when polyurethane ether foam produced by using a mixture of 2,4- and 2,6-tolylene diisocyanate of 80:20 is decomposed by means of 2,4- and 2,6-diaminotoluene as the decomposing agent in the coexistence of hydroxide or oxide of alkali metal or alkaline earth metal, diaminotolene of the decomposed product can be obtained in high purity. Alternatively, when urethane elastomer produced by using 1,5-naphthylenediisocyanate is decomposed by means of 1,5-diaminonaphthalene as the decomposing agent in the coexistence of hydroxide or oxide of alkali metal or alkaline earth metal, it is not necessary similarly to separate and purify 1,5-diaminonaphthalene of the decomposed product but said compound can be obtained in high purity.

The amines to be used in the present invention serve as the decomposing agent in the decomposition reaction and as solvent in the reaction system.

As the amine to be used, mention may be made of various amines, such as aliphatic amines, cycloaliphatic amines, aromatic amines and heterocyclic amines for example, aliphatic amines, such as, di-n-butylamine, ethylenediamine, tetramethylenediamine, hexamethylenediamine, n-hexylamine, 2-ethylhexylamine, monoethanolamine, diethanolamine, triethanolamine, triethylamine, n-propylamine, di-n-propylamine, tri-n-propylamine, n-amylamine, isobutylamine, isoamylamine, methyldiethylamine; cycloaliphatic amines, such as cyclohexylamine, piperadine, piperidine; aromatic amines, such as aniline, methylaniline, dimethylaniline, diethylaniline, ortho-, metha- and para-toluidine, benzylamine, dimethylbenzylamine, diethylbenzylamine, ortho-, metha- and para-anisidine, ortho-, metha- and para-chloroaniline, paraphenetidine, ortho-phenylenediamine, 2,4- and 2,6-tolylenediamine, 4,4'-diaminodiphenylmethane, 1,5-diaminonaphthalene, α-naphthylamine; heterocyclic amines, such as, pyridine, α- and β-picoline, N-methylmorpholine, N-ethylmorpholine, pyrazole. These amines may be used either alone or in admixture of two or more thereof.

Although the amine compounds mentioned above serve as the decomposing agent in the decomposition reaction system and as the solvent, if necessary, inert organic solvents, such as, ortho-dichlorobenzene, xylene, nitrobenzene, trichlorobenzene and etc. can be used in combination in the decomposition system in order to proceed the decomposition reaction of these urethane polymers smoothly. Furthermore, it is possible to use the same polyether as the polyether of base material of the urethane polymer to be decomposed as the solvent in the decomposition reaction system. In this case, the amount of the decomposing agent consumed is small and, particularly it is possible to omit the process for removing polyether used as solvent.

As oxides or hydroxides of alkali metal or alkaline earth metal which exist in the decomposition system together with the amines, mention may be made of lithium hydroxide, sodium hydroxide, potassium hydroxide, magnesium hydroxide, calcium oxide, lithium oxide, sodium peroxide, potassium peroxide, magnesium oxide, calcium oxide, barium oxide and etc.

In the compounds of alkali metal or alkaline earth metal to be used together with the amines, the compounds which are soluble in the amine in the range of dissolution temperature are mixed as such with said amines and dissolved in them. The compounds which are insoluble in the amines but soluble in water are prepared into an aqueous solution. Furthermore, the compounds which are insoluble in both of the amines and water are crushed, mixed and emulsified in the amine solvent and the resulting emulsion is used.

Furthermore, the decomposition carried out by contact with the decomposing agents comprising the amine and a compound of alkali metal or alkaline earth metal according to the present invention may be effected in two steps.

That is, as the first step, the urethane polymer can be decomposed firstly only by the decomposing agent of amines to carry out the decomposition reactions shown in the reaction Formula I and II and then as the second step the decomposition reaction shown by the Formula III can be proceeded by adding and contacting with a compound of alkali metal or alkaline earth metal.

The principal object of the invention is to recover the polyether of the base material in the original state by decomposing the urethane polymer.

Acordingly, the decomposition according to the present invention is usually performed at a temperature of less than 250° C. and may be carried out under a pressure. When the urethane polymer is completely decomposed in the mixture system of the amines and the inorganic compounds, a homogeneous one layer liquid or liquid of more than two layers can be formed by leaving to stand the decomposed liquid depending upon the kinds of the amine and the urethane polymer to be used. In the case of one layer liquid, said liquid is directly subjected to distillation under a reduced pressure and in the case of more than two layers liquid, said liquid is directly subjected to distillation under a reduced pressure or each layer is separated and then each layer is subjected to distillation under a reduced pressure. The solvent of excess amines and the amine derivatives as the decomposed product can be obtained as fraction and the polyether can be obtained as residue of distillation. Although the conditions of the decompositions are different in each case, the distillation under a reduced pressure can be applied to various urethane polymers and, for example, such a distillation can be applied to every known urethane polymer based on polyether having hydroxyl number of 40 to 800. Instead of the distillation under a reduced pressure, extraction can be effected by means of a solvent. Namely, after completion of the decomposition, polyether and amine derivative of the decomposed product and amine compound used as the decomposing agent can be dissolved by adding a suitable organic solvent to remove insoluble inorganic substance, after which a solvent which is not compatible with the organic solvent previously added can be added to extract and to separate the amine derivative of the decomposed product.

The identification of the decomposed product was effected as follows. Thus, after completion of the decomposition, the residue of the distillation was completely purified and the hydroxyl number and infrared absorption spectrum of the purified product were determined. As the result, it was identified that the resulting substance corresponds to the same polyether as the starting material used in the production of urethane polymer to be decomposed. This recovered polyether could be reused for production of the urethane polymer used in the decomposition solely or in admixture with commercially available polyether. Then, the fraction recovered by the distillation under a reduced pressure was left to cool, whereby amine compound can be isolated solely. The isolated amine was purified by recrystallization. The purified substance was proved to be the amino compound having a chemical structure in which the isocyanate group of polyisocyanate compound used for production of the urethane polymer used in the decomposition is substituted with amino group as the result of melting point, quantitative analysis for nitrogen, infrared absorption spectrum and mixed melting point test. In a polyurethane foam produced by using a mixture of 2,4- and 2,6-tolylene diisocyanate of 80:20 or a mixture of 65:35, 2,4-diaminotoluene, and 2,6-diaminotoluene could be successfully isolated in a high yield. When decomposing urethane elastomer produced by using 2,4-tolylene diisocyanate or 1,5-naphthalene diisocyanate, 2,4-diaminotoluene or 1,5-diaminonaphthalene could be isolated respectively. These amine compounds can be used again as a starting material for production of isocyanate compound by phosgenation or used easily to various applications such as a starting material for dyestuff, pesticide for agriculture, medicine and the like.

For a better understanding of the invention reference is taken to the accompanying drawings, wherein FIG. 1 is a curve of infrared absorption spectrum of polyether recovered in Example 1;

The invention will be illustrated further in detail.

Example 1

Figure 1:
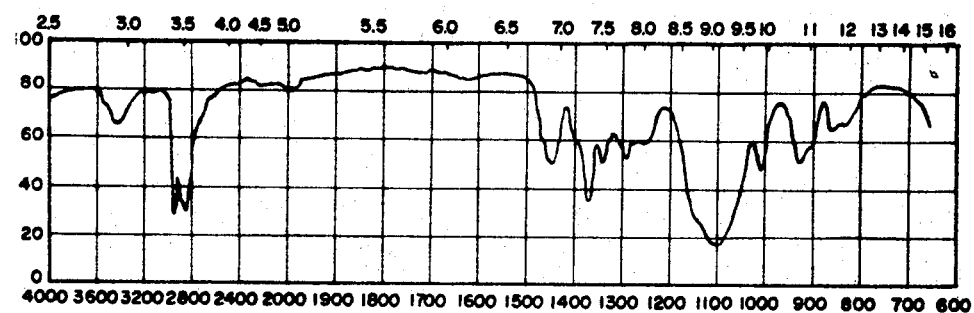
Figure 2:
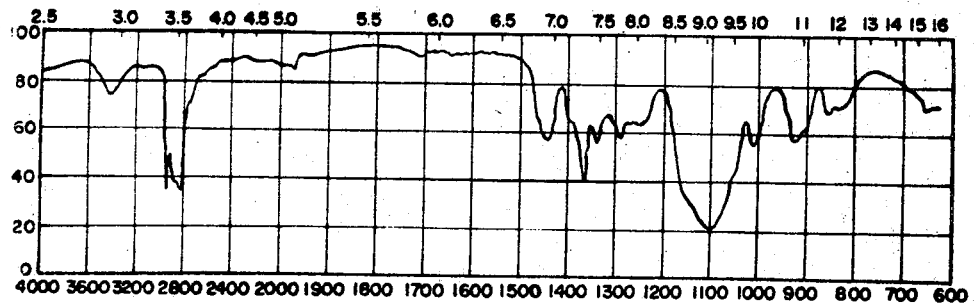
FIG. 2 is a curve of infrared adsorption spectrum of polyether of the starting material used in the production of flexible polyurethane foam in Example 1.
Figure 3:
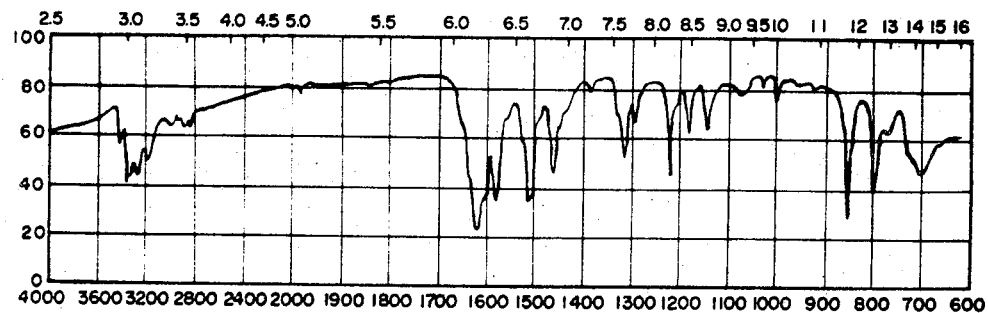
FIG. 3 is a curve of infrared adsorption spectrum of amine compound recovered in Example 1.
Figure 4:
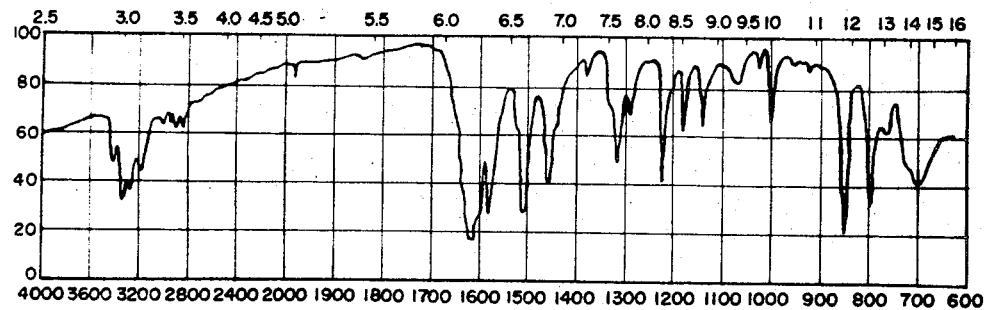
FIG. 4 is a curve of infrared adsorption spectrum of known 2,4-diaminotoluene.

A three-neck vessel was equipped with a cooling condenser and a stirrer to agitate the content. The vessel was dipped in an oil bath and a heating device was assembled. To the vessel were fed 2,000 g. of monoethanolamine and 300 g. of sodium hydroxide and the mixture was heated to a temperature of 150 to 160° C. While maintaining this temperature, a flexible polyurethane ether foam chip having specific gravity of 0.020 which had been produced from polyether having an average molecular weight of about 3,000 and hydroxyl number of 56, and a mixture of 2,4-tolylene diisocyanate and 2,6-tolylene diisocyanate of 80:20 by water blowing, was added gradually to the vessel while stirring. In this manner the flexible polyurethane foam was decomposed in total amount of 2,600 g. After completely decomposed, this temperature was maintained for about 3 hours and the stirring was continued. When stopped the stirring, the content was separated into a yellowish orange upper layer liquid and reddish purple lower layer liquid. Each liquid was hot separated to obtain about 2,100 g. of upper layer liquid and 2,400 g. of lower layer liquid. The upper layer liquid was distilled under a pressure of 5 to 7 mm. Hg to yield 280 g. of fraction having a range of boiling point of 76 to 116° C. and 1,700 g. of the residue. It was found from the following results that the residue of the upper layer liquid is crude polyether. The determination of hydroxyl number for a portion of said residue which was washed with water repeatedly to be purified, gave a hydroxyl number of 57.2 and the infrared spectrum thereof (FIG. 1) was quite identical to that (FIG. 2) of polyether (its hydroxyl number 56.4) which was the starting material of the flexible polyether foam to be decomposed. The purified polyether was mixed with a commercial triol polyether having a hydroxyl number of 56 in the ratio of 1:1, 3.5 parts of water, 1.2 parts of silicon oil (L–520), 0.05 part of triethylene-diamine, 0.3 part of stannous octoate (T–9) and 46.2 parts of 80:20 mixture of 2,4- and 2,6-tolylene diisocyanate per 100 parts of resulting mixed polyether were stirred quickly to yield a flexible polyurethane foam having a specific gravity of 0.030 and a 25%-hardness of 12 kg./50 in.² The crude polyether of the distillation residue of upper layer liquid, even alone gave approximately same flexible polyurethane foam in the same formulation by washing with water to be purified. The lower layer liquid was then distilled under a pressure of 3 to 7 mm. Hg to obtain 2.2 kg. of a fraction having a range of boiling point of 54 to 159° C. and 150 g. of residue. By cooling the fraction from the upper layer liquid and the fraction from the lower layer liquid respectively, needle crystals were precipitated which are recrystallized from the hot water. The resulting crystals had melting point of 98 to 99° C., showed no dropping of melting point by a mixed melting point test, the quantitative analysis for nitrogen was 22.5% (found) compared with the theoretical value of 22.8% and the infared spectrum (FIG. 3) was quite identical to the known infrared adsorption spectrum (FIG. 4), was identified to be 2,4-diaminotoluene. This filtrate was subjected to a precise fractional distillation to isolate further crystals, which were identified to be a mixture of 2,4- and 2,6-diaminotoluene. Furthermore, the liquid fraction was almost the recovered product of monoethanolamine. The purified diaminotoluene was obtained 390 g. in total.

Example 2

By using the same vessel as described in Example 1, 750 g. of monoethanolamine, 750 g. of aniline, 100 g. of calcium oxide and 50 g. of calcium sulphate-dihydrate were fed to the vessel and the mixture was heated to a temperature of 150 to 160° C. While maintaining this temperature, 1,200 g. of rigid polyurethane foam chip which had been produced from polyol having hydroxyl number of 460 of sorbitol base and crude tolylene diisocyanate and foamed by means of trichloromonofluoromethane as foaming agent, were gradually added to the vessel while stirring. The rigid polyurethane foam was then decomposed. After completely decomposed, the stirring was continued for about three hours while maintaining this temperature to obtain yellowish brown oily liquid. The liquid was distilled under a pressure of 7 to 9 mm. Hg to obtain 1,400 g. of fraction having a range of boiling point of 45 to 135° C. When this fraction was left to cool, 30 g. of needle crystals were obtained. The crystals were recrystallized from water and the resulting crystal was provided to be 2,4-diaminotoluene as the result of mixed melting point test, quantitative analysis for nitrogen and infrared absorption spectrum as described in Example 1. The liquid fraction was almost the recovered product of monoethanolamine and aniline. Furthermore, 1,000 g. of the residue of distillation were obtained, one portion of which was washed with water to be purified. The purified product had hydroxyl number of 472 and it has been ascertained that the infrared absorption spectrum corresponds to polyol of the starting material for the polyurethane foam used in the decomposition. Namely, crude polyol was recovered. This crude polyol was mixed with commercially available polyether of sorbitol base having hydroxyl number of 460 at a ratio of 1:1 and to the mixed polyether of 100 parts, 75 parts of crude tolylene diisocyanate, 30 parts of trichloromonofluoromethane, 1.5 parts of silicon oil (L–520) and 1.0 part of stannous octoate (T–9) were rapidly mixed and the mixture was stirred to obtain rigid polyurethane foam having specific gravity of 0.040.

Example 3

A three-neck vessel was equipped with a cooling condenser and a stirrer to agitate the content, the vessel was dipped in an oil bath and a heating device was assembled. To the vessel, 500 g. of polyether (an average molecular weight of about 3,000, hydroxyl number of 56) are as solvent, 100 g. of a mixture of 2,4-diaminotoluene and 2,6-diaminotoluene of 80:20 as the decomposing agent and 400 g. of granular sodium hydroxide are fed and the mixture was heated to 160±3° C. while stirring. While maintaining this temperature, a flexible polyurethane ether foam chip having specific gravity of 0.020 which had been produced from polyether having an average molecular weight of about 3,000 and hydroxyl number of 56 and a mixture of 2,4- and 2,6-tolylene diisocyanate of 80:20 by water-blowing, was added gradually to the vessel while stirring. The flexible polyurethane foam was then decomposed in total amount of 2,000 g. After completely decomposed, this temperature was maintained for about 3 hours and the stirring was continued to form yellowish brown liquid, which was subjected to distillation under a pressure of 0.2 mm. Hg. As the original fraction, a small amount of water was distilled off and then a distillate was obtained in a range of boiling point of 148 to 151° C. and the distillate was cooled to obtain 890 g. of crystal immediately. This crystal as such shows melting point of 88 to 89° C. without any purification (melting point of a mixture of 2,4-diaminotoluene and 2,6-diaminotoluene of 80:20 is 89° C.). The crystal which was recrystallized from hot water to be purified showed melting point of 99° C. (melting point of known 2,4-diaminotoluene is 99° C.). The quantitative analysis for nitrogen of the crystal which was distilled off as such showed 22.6% (theoretical value of nitrogen in diaminotoluene is 22.8%). The infrared absorption spectrum of the recrystallized product corresponded completely to that of known 2,4-diaminotoluene. The purity of the distilled product was determined by JIS K–4164 resulting in 99.2%. From these facts it has been proved that the mixture of 2,4-diaminotoluene and 2,6-diaminotoluene of 80:20 having high purity can be obtained in a high purity and a high yield by decomposition of polyurethane foam.

It was found from the following fact that the residue is the recovered product of polyether of the starting material for polyurethane foam used in the decomposition which contains a large amount of sodium carbonate. That is, in order to remove sodium carbonate from this residue, to the residue was added about three times (by weight) water and the mixture was stirred and then left to stand. Then layer separation was occurred and upper layer of polyether was removed and said layer was again subjected to the same process. A small amount of basic material in the resulting wet polyether was neutralized with an acid and then the mass was washed with water repeatedly. This wet polyether was dehydrated and dried under a reduced pressure and the hydroxyl number of the resulting polyether was determined resulting in 57 (hydroxyl number of polyether of the starting material is 56 to 57). Furthermore, the infrared absorption spectrum corresponded completely to that of polyether of the starting material. This recovered polyether could be used to produce polyurethane foam again.

Example 4

To the same vessel as described in Example 1 were fed 2,000 g. of monoethanolamine, which was heated to a temperature of 160 to 170° C. While maintaining this temperature, the same flexible polyurethane ether foam chip as used for the decomposition in Example 1 was added gradually to the vessel while stirring and then the flexible polyurethane foam was decomposed. In this manner, 6,000 g. of said polyurethane foam were decomposed. After the decomposition this temperature was maintained for about three hours and the stirring was continued. When the stirring was stopped, the content was separated into yellowish orange upper layer liquid and reddish purple lower layer liquid. Each liquid was hot separated to obtain 3,700 g. of upper layer liquid and 4,200 g. of lower layer liquid.

The upper layer liquid was distilled under a reduced pressure to remove substance having a lower boiling point and the residue was washed with water repeatedly to be purified. The resulting product was identified to be the recovered product of polyether of the starting material for the production of the flexible polyurethane foam used in the decomposition as the result of determination of the hydroxyl number and the infrared absorption spectrum. The fraction having the lower boiling point was the recovered product of monoethanolamine used for the decomposing agent.

To 4,200 g. of the lower layer liquid separated were added 500 g. of granular sodium hydroxide and the mixture was heated to a temperature of 160 to 170° C. and stirred for about 2 hours. Then the total amount was subjected to distillation under a pressure of 3 to 5 mm. Hg to recover monoethanolamine used as the decomposing agent at boiling point of 51 to 60° C. and a fraction having high boiling point of 152 to 154° C., which was left to cool to separate 1,200 g. of crystals. It has been found that this crystal is the recovered product of a mixture of 2,4-diaminotoluene and 2,6-diaminotoluene as the result of the infrared absorption spectrum and quantitative analysis for nitrogen.

Example 5

To the same vessel as used in Example 1, were fed 500 g. of polyether (average molecular weight of about 3,000, hydroxyl number of 56) as solvent, 100 g. of a mixture of 2,4- and 2,6-diaminotoluene as the decomposing agent and 400 g. of granular sodium hydroxide and the mixture was heated to a temperature of 160±3° C., while stirring. While maintaining this temperature, flexible polyurethane foam chip having specific gravity of 0.020 which had been produced from polyether having average molecular weight of about 3,000 and hydroxyl number of 56 and a mixture of 2,4- and 2,6-tolylene diisocyanate of 80:20 was gradually added to the vessel while stirring. In this manner, 2,000 g. of the flexible polyurethane foam were decomposed in total amount. After completely decomposed, this temperature was maintained for about 3 hours and the stirring was continued to form yellowish brown liquid, which was left to cool and then about 5 liters of tetrachloroethylene were added and the mixture was stirred to dissolve the decomposed product. The undissolved inorganic material was filtered off. To the resulting liquid was added about two times by volume of water and the mixture was stirred and then left to stand to form two layer liquid. Amine derivative produced in the decomposition was extracted into the aqueous solution of the upper layer. The same extraction process was repeated three times. Polyether produced in the decomposition was dissolved in tetrachloroethylene solution of the lower layer. The aqueous solution of the upper layer were collected and from the collected solution an excess amount of water was evaporated off under a reduced pressure to concentrate to about ¼ of the original volume. The concentrated solution was left to cool to separate needle crystals, which were filtered off and dried. The resulting product had melting point of 97° C. and was found to be 2,4-diaminotoluene as the result of the infrared absorption spectrum and quantitative analysis for nitrogen. The filtrate was concentrated to obtain additional needle crystals. The crystals thus obtained were 600 g. in total. Furthermore, the solvent in the lower layer liquid was removed under a reduced pressure to obtain a viscous liquid, which was purified resulting in hydroxyl number of 57. The infrared absorption spectrum of the purified product corresponded completely to that of polyether of the starting material of polyurethane foam used in the decomposition. By using the recovered polyether, flexible polyurethane foam was obtained in the same manner as described in Example 1.

Example 6

The same part by weight of dimethylaniline instead of monoethanolamine in Example 1 was used to obtain crude polyol and diaminotoluene as described in Example 1. The crude polyol was mixed with commercially available triol-polyether having hydroxyl number of 56 in the same manner as described in Example 1 to obtain flexible polyurethane foam.

Example 7

The same part by weight of cylcohexylamine instead of said monoethanolamine as described in Example 1 was used to obtain crude polyol and diaminotoluene as described in Example 1. When the purified polyether was mixed with commercially available polyether and the mixture was foamed, flexible polyurethane foam was obtained.

Example 8

The same part by weight of pyridine instead of monoethanolamine as described in Example 1 was used to obtain crude polyol and diaminotoluene as described in Example 1. When the purified polyol was mixed with commercially available polyether and the mixture was foamed in the same manner as described in Example 1, flexible polyurethane foam was obtained.

Example 9

To the same vessel as described in Example 1 were fed 300 g. of monoethanolamine, 200 g. of aniline, 50 g. of sodium sulphate·decahydrate (Glauber's salt) and 100 g. of sodium hydroxide and the mixture was heated to a temperature of 150 to 160° C. Polyurethane elastomer chip cross-linked 100 parts of prepolymer having 4% of free isocyanate produced from polytetramethylene ether glycol having hydroxyl number of about 130 and 2,4-tolylene diisocyanate with 11 parts of 4,4'-methylene bis-(2-chloroaniline) was gradually added to the vessel while stirring. In this manner, the urethane elastomer was decomposed in total amount of 1,000 g. After completely decomposed, this temperature was maintained for 2.5 hours and the stirring was continued. Then the stirring was stopped and the content was separated into clear light red upper layer liquid and yellowish brown lower layer liquid, each layer was hot separated to obtain 907 g. of upper layer liquid and 620 g. of lower layer liquid. The upper layer liquid was distilled under a pressure of 3 to 6 mm. Hg to obtain fraction having the boiling point of 52 to 198° C. The residue was 740 g. and the fraction was 167 g. The fraction was left to cool to obtain about 85 g. of crystals, which was purified. The purified product was ascertained to be 2,4-diaminotoluene as the result of melting point, quantitative analysis for nitrogen, infrared absorption spectrum and mixed melting point test. Furthermore, the liquid fraction was almost the recovered product of monoethanolamine and aniline of amine solvent used in the decomposition. After the liquid residue was purified, the purified product was found to be polyol having hydroxyl number of about 135 and polyether of base material of polyurethane elastomer used in the original decomposition was recovered. Then the lower layer liquid was distilled under a pressure of 3 to 6 mm. Hg in the same manner to obtain 480 g. of fraction having boiling point of 91 to 232° C. This fraction was left to cool to obtain about 40 g. of crystalline product, which was ascertained to be 2,4-diaminotoluene as in the case of fraction of distillation under a reduced pressure of the upper layer liquid as the result of melting point, quantitative analysis for nitrogen, infrared absorption spectrum and mixed melting point test. The residue was left to cool to obtain about 15 g. of crystalline product, the main component of which was ascertained to be the recovered product of 4,4'-methylene-bis-(2-chloroaniline) which was the cross-linking agent used for production of urethane elastomer used originally in the decomposition. The recovered polyether was reacted with 2,4-tolylene diisocyanate to produce prepolymer having 4% of free isocyanate, which was cross-linked again with 4,4'-methylene-bis-(2-chloroaniline) to obtain the urethane elastomer having the substantially same physical properties as those of urethane elastomer used originally in the decomposition.

Example 10

Diethanolamine and triethanolamine were used as in Example 9 instead of monoethanolamine to obtain the substantially same results.

What we claim is:

1. A method of decomposing a polyurethane produced by reacting a polyether and an organic polyisocyanate which comprises:
    (A) thermally decomposing said polyurethane at a temperature of less than about 250° C. in the presence of:
        (1) at least one amine selected from the group consisting of (i) aliphatic amines, (ii) cycloaliphatic amines, (iii) aromatic amines, (iv) heterocyclic amines, and (v) derivatives thereof, and,
        (2) at least one compounds selected from the group consisting of (i) alkali metal oxides, (ii) alkali metal hydroxides, (iii) alkaline earth metal oxides, (iv) alkaline earth metal hydroxides, and (v) aqueous solutions thereof to obtain
            (a) an amine derivative having the chemical structure of said organic polyisocyanate wherein the —NCO groups of said organic polyisocyanate are substituted by amine groups, and,
            (b) said polyether, and
    (B) separating and recovering said amine derivative and said polyether.

2. The process of claim 1 wherein step (A) a mixture of said amine and said compound is used.

3. The process of claim 1 wherein step (A) the polyurethane is first contacted with said amine and is secondly contacted with said compound.

4. The process of claim 1 wherein said amine (A) (1) has the structure of said organic polyisocyanate wherein the —NCO groups of said organic polyisocyanate are substituted by amine groups.

5. The process of claim 1 wherein said thermal decomposition is effected in the presence of the same polyether as that used to prepare said polyurethane.

6. The process of claim 1 wherein said separation and recovery are accomplished by distillation under a reduced pressure.

7. The process of claim 1 wherein said separation and recovery are accomplished by extraction.

References Cited

UNITED STATES PATENTS

| | | | |
|---|---|---|---|
| 2,729,618 | 1/1956 | Muller et al. | 260—75 |
| 2,741,800 | 4/1956 | Brockway | 260—2.3 |
| 2,937,151 | 5/1960 | Ten Broeck et al. | 260—2.3 |
| 3,117,940 | 1/1964 | McElroy | 260—2.3 |
| 3,143,515 | 8/1964 | Hurley | 260—2.3 |
| 3,171,820 | 3/1965 | Volz | 260—2.5 |
| 3,300,417 | 1/1967 | McElroy | 260—2.3 |

FOREIGN PATENTS

| | | |
|---|---|---|
| 90,745 | 11/1957 | Norway. |
| 861,926 | 1/1953 | Germany. |
| 1,037,066 | 7/1966 | Great Britain. |
| 1,150,802 | 6/1963 | Germany. |

DONALD E. CZAJA, *Primary Examiner.*

F. McKELVEY, *Assistant Examiner.*